Patented Jan. 16, 1934

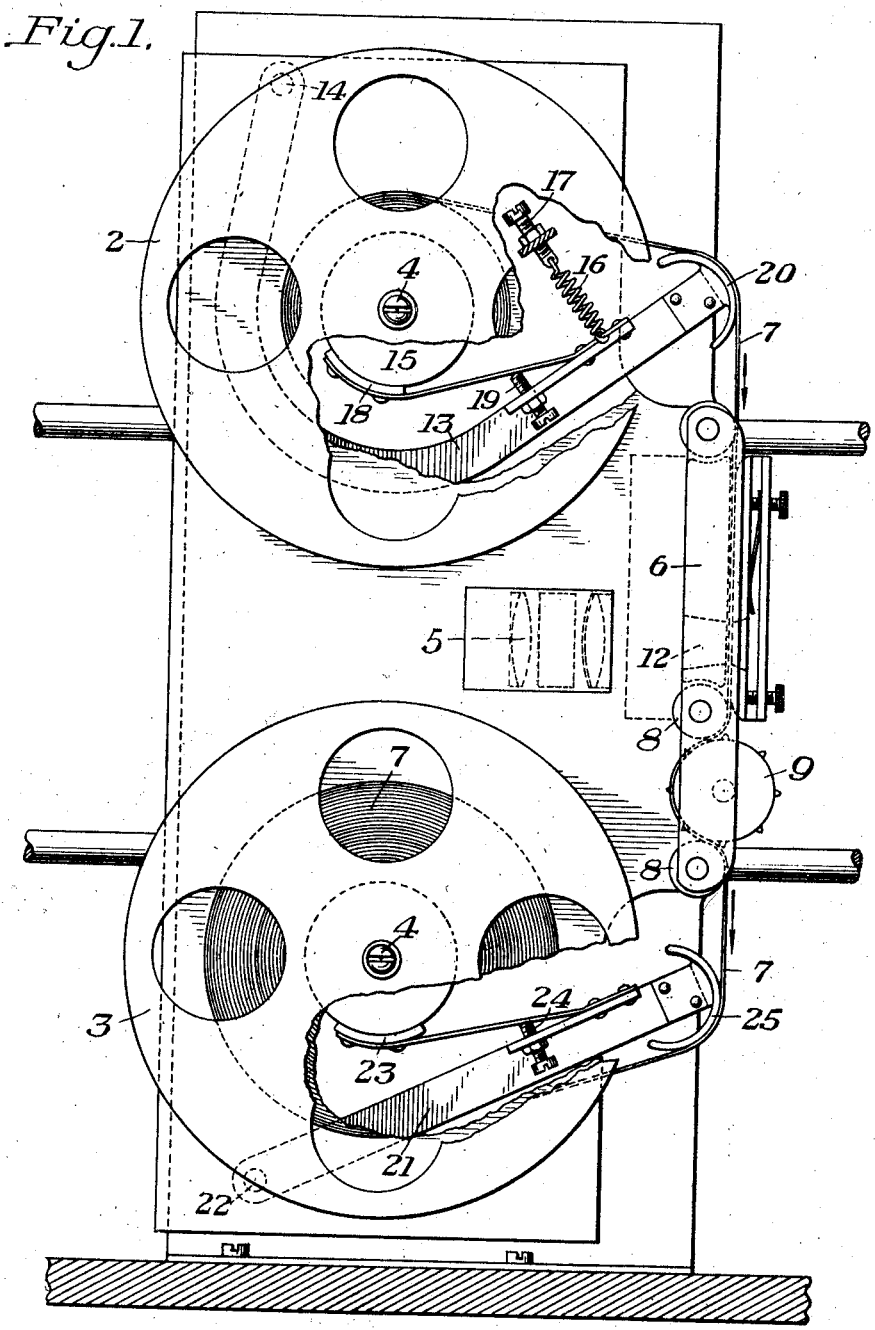

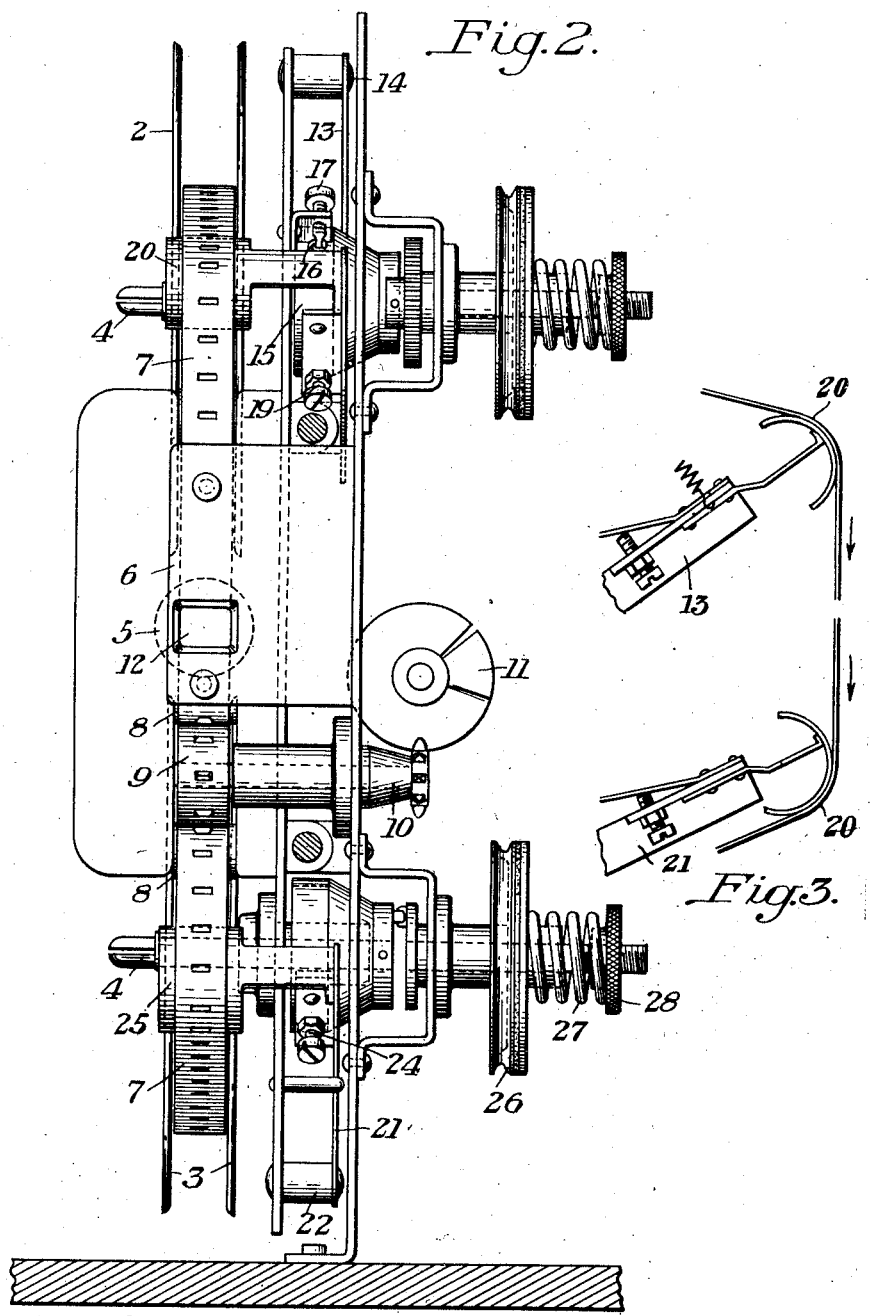

1,944,022

UNITED STATES PATENT OFFICE 1,944,022

APPARATUS FOR FEEDING MATERIAL

Clarkson U. Bundick, White Plains, and Barton A. Proctor, New York, N. Y., assignors, by mesne assignments, to Kinatome Patents Corporation, New York, N. Y., a corporation of New York Application July 18, 1925. Serial No. 44,482

49 Claims. (Cl. 88—17)

The present invention relates broadly to an improved apparatus for feeding material, and particularly to an apparatus more especially adapted for the feeding of film of the character ordinarily utilized for the taking or projection of socalled motion pictures, although the utility of the invention is not limited in this respect.

At the present time there is a demand in the art for an apparatus for effectively feeding material from one carrier to another and maintaining a predetermined condition in the material intermediate the carriers. Heretofore carriers have been driven in synchronism in order to maintain an amount of slack arbitrarily provided in the initial positioning of the material. The arbitrary provision of such slack, however, requires a manual operation, thereby involving the possibility of non-uniformity under varying conditions of operation.

As applied specifically to the art of feeding films, it is customary at the present time to carefully thread a film into position and provide the desired amount of slack manually, usually by the provision of a loop or loops. This method requires not only a careful and expert threading of the film but also considerable time, thereby rendering the film threading operation a somewhat lengthy and difficult task.

In accordance with the present invention there is provided an improved apparatus for feeding material by means whereof the material itself controls the amount of tension therein, thereby providing an automatically operating installation wherein the initial provision of slack by manual operation is rendered unnecessary. This constitutes one of the improvements included among the objects of the present invention.

In the accompanying drawings there is shown, for purposes of illustration only, a preferred embodiment of the present invention, it being understood that the drawings do not define the limits of our invention, as changes in the construction and operation disclosed therein may be made without departing from the spirit of the invention or the scope of our broader claims.

In the drawings:

Figure 1 is a side elevational view, partly broken away and largely diagrammatic, illustrating one embodiment of the present invention; and Figure 2 is a front view of the construction illustrated in Figure 1.

Figure 3 is a side view of means for yieldingly mounting the film guides upon the outer ends of the supports.

The present invention, as already pointed out, is not limited in its utility to the feeding of any particular material, although it is of decided importance in connection with the feeding of film, due to the necessity of obtaining accurate registration of successive pictures and due also to the frangible nature of the film and the necessity of so feeding it as to prevent the possibility of rupture. As applicable to the photographic art, the invention is not limited to any particular form of projecting or photographing apparatus, and the drawings accompanying this specification are merely for the purpose of illustrating an operative embodiment of the invention.

In carrying out the present invention in connection, for example, with the feeding of film, there may be provided an apparatus comprising a feeding reel 2 and a take-up reel 3, the reels being mounted for rotation on suitable spindles 4.

Located at a suitable point, preferably intermediate the reels, is any usual arrangement of lenses 5 in line with a gate 6 through which the material, herein illustrated as comprising a film 7, is threaded. The gate is conveniently provided with guiding wheels 8 over which the film passes. Preferably the gate is of sectional construction, one section carrying the wheels 8 and a portion of the gate, and the other section carrying the remainder of the gate and the intermittently rotating film feeding wheel 9. The wheel 9 in accordance with common practice may be secured to a shaft 10. The opposite end cooperates with a driving means 11 of the character adapted to intermittently rotate the wheel, as well understood in the art. As the feed wheel 9 intermittently rotates it feeds intermittently successive sections of the film past an aperture 12, whereby the portions of the film are successively exposed.

Cooperating with the feed reel is a braking and tensioning mechanism preferably comprising a supporting arm 13 having a pivotal mounting 14, the support preferably surrounding a substantial part of a drum 15 on the feeding reel. This support is normally urged upwardly, as shown in the drawings, in a counterclockwise direction by a spring 16 cooperating at one end with means 17 for adjustably varying the tension of the spring. Carried by the support is a brake shoe 18 having a suitable friction surface bearing against the drum 15, the normal pressure being adjustable in part by a stop 19 in combination with the adjustment 17. The outer end of the support may be very yieldingly or rigidly mounted thereon, and conveniently comprises a curved guide 20 over which the film is adapted to pass.

Cooperating with the lower reel 3 is a second braking and tensioning mechanism comprising a support 21 having a pivotal mounting 22 and carrying a brake shoe 23. This brake shoe, like the shoe 18, cooperates with an adjustable stop 24. The outer end of the support 21 is also provided with either yieldingly or a rigidly mounted film guide 25 over which the film must pass in its travel to the take-up reel.

The take-up reel may be driven in any desired manner, but the driving is preferably accomplished by means of a friction drive 26, adjustably controlled by means of a spring 27 and a nut 28, whereby the maximum driving force may be definitely limited.

The curved film guides 20 25 may be very yieldingly mounted upon the arms 13 and 21 in any desired manner. For purposes of illustration only, Figure 3 of the drawings shows one such manner. The film guides 20 may be attached to their respective arms as by flat springs as illustrated in Figure 3.

In actual operation the feeding of the film in the direction indicated by the arrow in Figure 1 will be effective for pulling the support 13 downwardly against the action of the spring 16 to thereby slightly release the brake and permit the film to unwind therefrom. The brake, however, is preferably never completely disengaged from the drum 15, the upper reel thereby being always maintained under a slight braking pressure effective for preventing over-running thereof. This is highly desirable, as it prevents the formation of any amount of slack, and consequently maintains more nearly uniform conditions of tension and feed.

The action of the lower braking and tensioning mechanism is preferably such as to counteract the pull of the friction drive. In other words, the greater the driving force required by reason of tension on the film, the greater will be the friction exerted by the brake shoe 23, for the reason that the tension on the film will be increased, thereby tending to move the support 21 upwardly, as shown in the drawings, in a counter-clockwise direction about its pivotal mounting, thereby causing the brake shoe 23 to bear more tightly against its braking surface. This increase in braking pressure in operation tends to lessen the effectiveness of the friction drive, and consequently the pull against the intermittent feed wheel or sprocket 9. In actual practice this mechanism has been found to accomplish a very decided improvement in registration at the apertures 12. It will be understood by those skilled in the art that the present apparatus provides a decidedly effective means of automatically maintaining the desired tension in a length of material by the material itself. As the amount of tension becomes too great, the pull of the material intermediate the two carriers will be increased, thereby decreasing the resistance to rotation on the delivering carrier, making the delivery of material easier in order to restore the desired tension conditions. At the same time such an increase in tension will serve to counteract to a desirable extent the force of the driving mechanism, whereby the material will not be subjected at any time to undue strain.

It will be realized that the invention is further of particular importance in connection with the motion picture industry; for example, wherein there is utilized apparatus embodying a gate through which the material must be fed, and particularly a sectional gate. This is true for the reason that by the use of a sectional gate the initial feeding of the film is expedited and by reason of the automatic control for the tension any manual adjustment is obviated.

To summarize the operation of the feeding apparatus; as the sprocket 9 revolves, the arm 13 is depressed and energy is stored in the spring 16. While the sprocket 9 is at rest, the spring 16 pulls the arm 13 upwardly, thereby causing an amount of film 7 to be pulled from the reel 2. Upon the next rotation of the sprocket 9, the film 7 is again moved downwardly, the portion necessary to compensate for this displacement being the amount of film previously pulled outwardly from the reel 2, and that which is at that moment pulled off of the reel 2. This downward movement of film 7 again moves the arm 13, stores up power in spring 16 which is used during the next period of rest of the sprocket 9 to pull more film from the reel 2, and that cycle is repeated throughout the entire period of operation.

As the result of the operation heretofore described, the delivery carrier and the take up carrier operate continuously, but at rates of speed which vary in step with the intermittent operation of sprocket 9, and all of the material between the carriers is continuously maintained at substantially uniform tension. As previously pointed out, the braking function of these auxiliary feeding mechanisms is useful, particularly when abnormal conditions of feeding arise, but is not necessary to the maintenance of the uniform tension of the film or to the auxiliary feeding operation above described.

As the result of the operation heretofore described, the delivery carrier and the take-up carrier operate continuously, but at rates of speed which vary in step with the intermittent operation of sprocket 9, and all of the material between the carriers is continuously maintained at substantially constant tension. As previously pointed out, the braking function of these auxiliary feeding mechanisms is useful, particularly when abnormal conditions of feeding arise, but is not necessary to the maintenance of the constant tension of the film or to the auxiliary feeding operation above described.

The advantages of the present invention arise from the provision of means for maintaining a braking pressure on a delivery carrier, thereby maintaining more nearly uniform and effective conditions of tension on the material and preventing over-running of the material from the delivery or feeding carrier.

Still other advantages of the invention arise from the provision of means cooperating with the take-up carrier, whereby the pull exerted through the driving mechanism is not transmitted in full and unregulated to the material or to the feeding mechanism.

Still further advantages arise from a mechanism of the character referred to as applied to the motion picture industry or to the feeding of sensitized or photographic film in that it serves to decrease pull on the feeding sprocket and thereby insure more accurate registration of successive exposures at the gate aperture.

Additional advantages arise from the provision of auxiliary feeding means operated by the film itself which, without any preliminary manipulation by the operator, are effective for compensating for the differences in characteristics of movement of the intermittent feeding member at the aperture, the delivery reel and the continuously driven take up reel, while maintaining the entire operative length of the film under substantially constant tension and minimizing the strain and wear thereupon.

We claim:

1. In a film handling apparatus, two reels, a gate therebetween, a bight of film extending from each reel to the gate, two movable film guides, each having a curved surface which engages one of the bights of the film between the gate and the appropriate reel, one leg of the film extending in a direct line from the curved surface of each guide to its relatively adjacent reel while the other leg extends in a direct line from said curved surface to the gate, feeding means for intermittently drawing the film from one reel through the gate and advancing it toward the other reel, and means operative in step with each such feeding movement for thrusting each of said guides forwardly toward the film to increase the length of both legs of each bight.

2. In a film handling apparatus, two reels, a gate therebetween, a bight of film extending from each reel to the gate, two movable film guides each having a curved surface which engages one of the bights of the film between the gate and the appropriate reel, one leg of the film extending in a direct line from the curved surface of each guide to its relatively adjacent reel while the other leg of said film extends in a direct line from said curved surface to the gate, feeding means for intermittently drawing the film from one reel through the gate and advancing it toward the other reel, means operative in step with each intermittent feeding movement for thrusting each of said guides forwardly toward the film for maintaining both legs of each bight under tension.

3. In a film handling apparatus, two reels, a gate therebetween, a bight of film extending from each reel to the gate, two movable film guides each having a curved surface which engages one of the bights of the film between the gate and the appropriate reel, one leg of the film extending in a direct line from the curved surface of each guide to its relatively adjacent reel while the other leg of said film extends in a direct line from said curved surface to the gate, feeding means for intermittently drawing the film from one reel through the gate and advancing it toward the other reel, and a spring for thrusting each of said guides forwardly toward the film to tension the film during each operation of said intermittent feeding means.

4. In a film handling apparatus, two reels, a gate therebetween, a bight of film extending from each reel to the gate, two movable film guides each having a curved surface which engages one of the bights of the film between the gate and the appropriate reel, one leg of the film extending in a direct line from the curved surface of each guide to its relatively adjacent reel while the other leg of said film extends in a direct line from said curved surface to the gate, feeding means for intermittently drawing the film from one reel through the gate and advancing it toward the other reel, and a spring for thrusting each of said guides forwardly toward the film to tension the film and increase the length of both legs of its bight during the tensioning, the power of said springs in relation to the constants of said apparatus being such as to operate each of said guides in step with each operation of said intermittent feeding means.

5. In a film handling apparatus, a delivery carrier and a yieldingly driven take-up carrier, a gate therebetween, a first bight of the film extending between said delivery carrier and said gate, a first film guide having a curved surface continuously engaging the film in said first bight, one leg of the film of said first bight extending in a direct line from the curved surface of said first guide to the delivery carrier while the other leg extends in a direct line from said first surface to said gate, a second bight of the film extending between said gate and said take-up carrier, a second film guide having a curved surface constantly engaging the film in said second bight, one leg of the film of said second bight extending in a direct line from the gate to the curved surface of said second guide and the other leg of said bight extending in a direct line from said curved surface to said take-up carrier, means for intermittently pulling the film directly from said delivery carrier and advancing it toward said take-up carrier thereby decreasing said first bight and increasing said second bight, means operative in step with each such intermittent feeding operation for thrusting said first guide forward toward the film to increase the length of both legs of said first bight, and means operative in step with each such intermittent feeding operation to urge said second guide forward toward the film to maintain said bight under tension.

6. In a film handling apparatus, a delivery carrier and a yieldingly driven take-up carrier, a gate therebetween, a first bight of the film extending between said delivery carrier and said gate, a first film guide having a curved surface continuously engaging the film in said first bight, one leg of the film of said first bight extending in a direct line from the curved surface of said first guide to the delivery carrier while the other leg extends in a direct line from said curved surface to said gate, a second bight of the film extending between said gate and said take-up carrier, a second film guide having a curved surface constantly engaging the film in said second bight, one leg of the film of said second bight extending in a direct line from the gate to the curved surface of said second guide and the other leg of said bight extending in a direct line from said curved surface to said take-up carrier, means including a toothed feeding member for intermittently pulling the film directly from said delivery carrier and advancing it toward said take-up carrier thereby decreasing said first bight and tending to increase said second bight, a first means operative after each such intermittent feeding movement for thrusting said first guide forwardly toward the film to increase the length of both legs of said first bight in preparation for the next intermittent feeding movement, and a second means operative after each such intermittent feeding movement for urging said second guide forwardly toward the film in opposition to the operation of said driven take-up carrier so that the continued operation of said take-up carrier during the inactivity of said intermittent feeding means does not pull the film directly against the teeth of said feeding member.

7. In a film handling apparatus, a delivery carrier and a continuously driven take-up carrier, a gate therebetween, a first bight of the film extending between said delivery carrier and said gate, a first film guide having a curved surface continuously engaging the film in said first bight, one leg of the film of said first bight extending in a direct line from the curved surface of said first guide to the delivery carrier while the other leg extends in a direct line from said curved surface to said gate, a second bight of the film extending between said gate and said take-up carrier, a second film guide having a curved surface constantly engaging the film in said second bight, one leg of the film of said second bight extending in a direct line from the gate to the curved surface of said second guide and the other leg of said bight extending in a direct line from said curved surface to said take-up carrier, means including a toothed feeding member for intermittently pulling the film directly from said delivery carrier and advancing it toward said take-up carrier thereby decreasing said first bight and tending to increase said second bight, a first means operative during each such intermittent feeding movement for urging said first guide in opposition to the power of said intermittent feeding movement thereby maintaining a portion of each leg of said bight and transferring some of the force of said intermittent feeding movement to the mass of film upon said delivery carrier thereby tending to keep said delivery carrier in motion, and means operative during each such intermittent feeding movement for thrusting said second guide forwardly toward the film to distribute a portion of the film being advanced by said intermittent feeding movement in both legs of said bight while said continuously driven take-up carrier coils the remaining portion of the film so advanced upon itself thereby retaining between said intermittent feeding member and said take-up carrier a surplus of film which may be coiled upon said take-up carrier in the succeeding interval of inactivity of said feeding means so that said take-up carrier will continue constantly in motion.

8. In a film handling apparatus, a delivery carrier and a continuously driven take-up carrier, a gate therebetween, a first bight of the film extending between said delivery carrier and said gate, a first film guide having a curved surface engaging the film in said first bight, one leg of the film of said first bight extending in a direct line from the curved surface of said first guide to the delivery carrier while the other leg extends in a direct line from said curved surface to said gate, a second bight of the film extending between said gate and said take-up carrier, a second film guide having a curved surface engaging the film in said second bight, one leg of the film of said second bight extending in a direct line from the gate to the curved surface of said second guide and the other leg of said bight extending in a direct line from said curved surface to said take-up carrier, means including a toothed feeding member for intermittently pulling the film directly from said delivery carrier and advancing it toward said take-up carrier thereby decreasing said first bight and tending to increase said second bight, a first spring operative after each intermittent feeding movement for thrusting said first guide forwardly toward the film to increase the length of both legs of the film of said first bight in preparation for the next intermittent feeding movement and to maintain the film in said first bight under tension, said first spring being of a power so proportioned in relation to the inertia of the delivery reel and the speed and force of movement of said intermittent feeding means as to operate said first guide following each intermittent feeding movement, and a second spring operative after each such intermittent feeding movement for urging said second guide forwardly toward the film in opposition to the operation of said driven take-up carrier so that the continued operation of said take-up carrier during the inactivity of said intermittent feeding means does not pull the film directly against the teeth of said feeding member, the power of said second spring being so related to the force and speed of said continuous take-up member and to the rate at which the film is advanced by said intermittent feeding means that said second spring operates said second guide following each intermittent feeding movement.

9. In a film handling apparatus, a delivery carrier, a gate, a bight of the film extending between said delivery carrier and said gate, a movable film guide having a curved surface engaging the film in said bight, one leg of the film in said bight extending in a direct line from the curved surface of said first guide to said delivery carrier while the other leg extends in a direct line from said curved surface to said gate, means for intermittently drawing the film directly from said delivery carrier and through said gate thereby decreasing said bight, and means operative after each such intermittent feeding movement for thrusting said guide forwardly toward the film to increase the length of both legs of said bight.

10. In a film handling apparatus, a delivery carrier, a gate, a bight of the film extending between said delivery carrier and said gate, a movable film guide having a curved surface engaging the film in said bight, one leg of the film in said bight extending in a direct line from the curved surface of said first guide to said delivery carrier while the other leg extends in a direct line from said curved surface to said gate, means for intermittently drawing the film directly from said delivery carrier and through said gate thereby decreasing said bight, and means operative during each such movement of said intermittent feeding means for moving said guide in opposition to the traction of the film by said intermittent feeding means thereby maintaining a portion of each leg of said bight and causing a portion of the force of said feeding means to be expended in drawing film directly from said delivery carrier.

11. In a film handling apparatus, a delivery carrier, a gate, a bight of the film extending between said delivery carrier and said gate, a movable film guide having a curved surface engaging the film in said bight, one leg of the film in said bight extending in a direct line from the curved surface of said first guide to said delivery carrier while the other leg extends in a direct line from said curved surface to said gate, means for intermittently drawing the film directly from said delivery carrier and through said gate thereby decreasing said bight, and means operative during each such movement of said intermittent feeding means for moving said guide in opposition to the traction of the film by said intermittent feeding means thereby maintaining a portion of each leg of said bight and causing a portion of the force of said feeding means to be expended in drawing film directly from said delivery carrier and operative after each such intermittent feeding movement for thrusting said guide forwardly toward the film to increase the length of both legs of said bight.

12. In a film handling apparatus, a gate, a continuously driven take-up carrier, a bight of the film extending between said gate and said take-up carrier, a film guide having a curved surface engaging the film in said bight, one leg of the film of said bight extending in a direct line from said gate to said curved surface and the other leg of said bight extending in a direct line from said curved surface to said take-up carrier, means including a toothed member for intermittently moving the film through said gate and advancing it toward said take-up carrier thereby supplying the length of film from which said bight may be increased, and means operative during each intermittent feeding movement of the film for thrusting said guide forward toward the film, thereby increasing both legs of the bight.

13. In a film handling apparatus, a continuously driven take-up carrier, a bight of the film extending between said gate and said take-up carrier, a film guide having a curved surface engaging the film in said bight, one leg of the film of said bight extending in a direct line from said gate to said curved surface and the other leg of said bight extending in a direct line from said curved surface to said take-up carrier, means including a toothed member for intermittently moving the film through said gate and advancing it toward said take-up carrier, the continued operation of said take-up carrier tending to coil the film so advanced upon itself and to destroy said bight, and means operative after each intermittent feeding movement and during the inactivity of said intermittent member for urging said guide in opposition to the traction of the film by said take-up carrier to maintain a portion of each leg of said bight so that the continued operation of said take-up carrier does not pull the film directly against the teeth of said feeding member.

14. In a film handling apparatus, feeding means for intermittently advancing a film, a continuously driven take-up reel, upon which the film so advanced is wound, said feeding means and said take-up reel being disposed in horizontally and vertically spaced relation one to the other, a movable film guide having a curved surface engaging the film between said reel and said feeding means thereby defining a bight in the film, one leg of the bight extending in a direct line from said feeding means to said curved surface and the other leg extending in a direct line from said curved surface to said take-up reel, each operation of said feeding means being effective to advance film from which said bight may be increased, and means operative during each such intermittent movement for urging said guide forward toward the film thereby maintaining both legs of said bight under tension.

15. In a film handling apparatus, two reels, feeding means comprising a toothed feeding member for intermittently drawing the film from one reel and advancing it toward the other reel, a bight of film extending from each reel to the feeding member, two movable film guides each having a curved surface which engages the bight of the film between the feeding member and the appropriate reel, one leg of the film extending in a direct line from the curved surface of each guide to its relatively adjacent reel while the other leg of said film extends in a direct line from said curved surface to the feeding member, and means operative in step with each feeding movement of said feeding member for thrusting each of said guides forwardly toward the film to increase the length of both legs of its bight.

16. In a film handling apparatus, two reels, feeding means comprising a toothed feeding member for intermittently drawing the film from one reel and advancing it toward the other reel, each of said reels being disposed in vertically and horizontally spaced relation to said feeding member, a bight of film extending from each reel to the feeding member, two movable film guides each having a curved surface which engages the bight of the film between the feeding member and the appropriate reel, one leg of the film extending in a direct line from the curved surface of each guide to its relatively adjacent reel while the other leg of said film extends in a direct line from said curved surface to the feeding member, and means operative in step with each feeding movement of said feeding member for thrusting each of said guides forwardly toward the film to increase the length of both legs of its bight.

17. Apparatus for the feeding of a band of film or like material, comprising a delivery or feeding reel, a take-up reel, a length of film extending continuously from one reel to the other, film-feeding means intermediate of said reels, and film tension control means acting on the film on opposite sides of the feeding means, these several elements being disposed in such relationship that the unwound portion of the film has no acute bends but is relatively straight throughout its length.

18. In a film handling apparatus, a delivery reel, an intermittent pulldown mechanism, a spring pressed arm engaging and forming a bight in a film between said reel and said pulldown, the pulldown being operative to advance the film intermittently and thus intermittently to reduce the size of the bight and move the arm against its spring tension, and the arm being operative to restore the bight to a predetermined size between each of such movements, the spring tension of the arm being so proportioned with respect to the inertia of the reel and to the speed and force of the pulldown that the film is withdrawn continuously from the reel.

19. In a film handling device, a film supply means including means for delivering film under predetermined retardance, an intermittent pulldown, a spring pressed arm engaging and forming a bight in the film between the supply means and the pulldown, the pulldown being operative to advance the film intermittently and thus intermittently to reduce the size of the bight and move the arm against its spring tension, and the arm being operative to restore the bight to a predetermined size between each of such movements, the spring tension of the arm being so proportioned with respect to the retardance of the film and to the speed and force of the pulldown that the film is withdrawn continuously from the supply means.

20. In a film handling apparatus, a continuously and yieldingly driven take-up member, an intermittent feeding member for advancing film thereto, and mechanism for compensating for the difference in character of movement of said intermittent feeding member and said continuous take-up member, said mechanism including a spring pressed member engaging the film and forming a bight therein between said feeding member and said take-up carrier, the spring pressed member being continuously pressed against the film under the influence of its spring and thus being effective during each period of operation of said feeding member to increase the size of the bight as the film is advanced to it by said feeding member and the continuously driven take-up carrier being operative during each period of idleness of said intermittent feeding member to reduce the size of the bight against the tension of the spring, the spring tension of said member being so proportioned in respect to the force and speed of the continuously driven take-up carrier and the frequency and speed of operation of said intermittent feeding member that the film is wound continuously upon said take-up carrier.

21. In a film handling apparatus, an intermittent pulldown mechanism, a continuously and yieldingly driven take-up reel, a spring pressed arm engaging and forming a bight in the film between said pulldown and said reel, the spring pressed arm being operative to increase the size of the bight each time the film is advanced to it by the pulldown and the reel being operative to reduce the bight to a predetermined size between each such advance of the film by the pulldown against the tension of the spring, the spring tension of the arm being so proportioned with respect to the force and speed of operation of the reel and the frequency and speed of operation of the intermittent feeding mechanism that the film is wound continuously upon said take-up reel.

22. In a film handling apparatus, film take-up means, including frictionally driven means for winding film thereon under a predetermined retardance, an intermittent pulldown for intermittently advancing film toward said take-up means, a spring pressed arm engaging and forming a bight in the film between the pulldown and the take-up means, the spring pressed arm being operative predeterminedly to increase the size of the bight each time the film is advanced toward it by the pulldown, and the carrier being operative to reduce the bight to a predetermined size between each such advance of the film by the pulldown, the spring tension of the arm being so proportioned with respect to the balance between the retardance of the film take-up means and the force and speed applied thereto and to the speed and frequency of operation of the pulldown that the film is moved continuously from the pulldown to the take-up means thereby causing the continuous operation of said frictionally driven take-up means.

23. In a film handling apparatus, a delivery carrier, a continuously driven take-up carrier, an intermittently toothed film-feeding member positioned between said carriers for drawing film from said delivery carrier and moving it toward said take-up carrier, and mechanism for compensating for the difference in character of movement of said carriers and said feeding member, said compensating mechanism associated with said delivery carrier including a spring pressed movable member engaging the film and forming a bight therein between said delivery carrier and said intermittent feeding member, the film feeding member being operative to pull the film intermittently directly from said delivery carrier and thus intermittently reduce the size of the bight and move the spring member against its spring tension, and the spring member being operative to restore the bight to a predetermined size between each of such movements, the spring tension of the member being so proportioned with respect to the inertia of the carrier and the speed and force of the feeding member that the film is withdrawn continuously from said carrier; and said compensating mechanism associated with said take-up carrier including a spring pressed member engaging the film and forming a bight therein between said feeding member and said take-up carrier, the spring pressed member being continuously pressed against the film under the influence of its spring and thus being effective during each period of operation of said feeding member to increase the size of the bight as the film is advanced to it by said feeding member and the continuously driven take-up carrier being operative during each period of idleness of said intermittent feeding member to reduce the size of the bight against the tension of the spring, the spring tension of said member being so proportioned in respect to the force and speed of the continuously driven take-up carrier and the frequency and speed of operation of said intermittent feeding member that the film is wound continuously upon said take-up carrier.

24. In a film handling apparatus, a delivery reel, a take-up reel, an intermittent pulldown mechanism, a first spring pressed arm engaging the film and forming a first bight in the film between said delivery reel and said pulldown, a second spring pressed arm engaging the film and forming a second bight in the film between said pulldown and said take-up reel, the pulldown being operative to advance the film intermittenly from the delivery reel and thus reduce the size of the first bight and increase the size of the second bight, the spring tension of the first arm being so proportioned with respect to the inertia of the delivery reel and the speed and force of the pulldown that the film is withdrawn continuously from the delivery reel, and the spring tension of the second arm being so proportioned with respect to the speed and force of the take-up reel and the speed and frequency of the pulldown that the film is wound continuously upon the take-up reel.

25. In a film handling apparatus, a film supply means including means for delivering film under a predetermined retardance, a film take-up means including means for winding up the film under a predetermined retardance, a first spring pressed arm engaging the film and forming a first bight in the film between said delivery reel and said pulldown, a second spring pressed arm engaging the film and forming a second bight in the film between said pulldown and said take-up reel, the pulldown being operative to advance the film intermittently directly from said supply means and thus reduce the size of the first bight and increase the size of the second bight, the spring tension of the first arm being so proportioned with respect to the retardance of the film as it moves from said supply means and to the speed and force of the pulldown that the film is withdrawn continuously from the supply means, the spring tension of the second arm being so proportioned with respect to the balance between the retardance upon the film and the force and speed applied to the film to wind the film upon the take-up reel and to the speed and frequency of the pulldown that the film is wound continuously upon the take-up reel.

26. In a film handling apparatus, intermittently driven means for moving a film, continuously operating driven means for taking up said film, a common source of power for both of said means, and means engaging the film intermediate said previously mentioned means for varying the rate of rotation of said continuously operating take-up means in step with the intermittency of movement of said intermittently moving means while permitting the continued operation of said continuously driven take-up means whereby the length of film between said intermittent means and said take-up means is maintained continuously in motion.

27. In a film handling apparatus, intermittently driven means for moving a film, continuously operating driven means for taking up said film, a common source of power for both of said means, and an auxiliary means for engaging the film between said previously mentioned means for moving the film away from said intermittent means and for maintaining said take-up means continuously in rotation at varying rates of speed whereby the length of film between said intermittent means and said take-up means is kept continuously in motion.

28. In a film handling apparatus, in combination, a rotatable delivery carrier, an intermittent member for feeding a film therefrom, a reciprocable auxiliary film feeding member mounted to engage the film in a bight thereof between said intermittent member and said carrier, operative movement of said feeding member for feeding the film being effective to move said auxiliary member toward said intermittent member and partly straighten out said bight and to draw film from said delivery carrier, resilient means for resisting the movement of said auxiliary member toward said intermittent member, said resilient means being powered to move said auxiliary feeding member to reestablish said bight in the film at such speed as to reach the end of its reciprocable travel away from said intermittent member approximately at the beginning of the advance of the film by the next succeeding feeding movement of said feeding member, whereby the film is continuously unwound from said reel, partly by said intermittent feeding member and partly by said auxiliary feeding member.

29. In a film handling apparatus, in combination, a continuously driven rotatable take-up carrier, an intermittent member for advancing a film toward said carrier, a reciprocable auxiliary film controlling member mounted to engage the film in a bight thereof between said intermittent member and said carrier, operative movement of said rotatable carrier for coiling the film thereupon being operative to move said auxiliary member toward said intermittent member and partly straighten out said bight and to coil film upon itself, resilient means for resisting the movement of said auxiliary member toward said intermittent member, said resilient means being powered to resist the movement of the film by said rotatable carrier at such rate as to cause said auxiliary member to reach the end of its reciprocable travel toward said intermittent member approximately at the beginning of the advance of the film by the next succeeding feeding movement of said feeding member whereby the film is continuously moved from said member toward said reel partly by its advance by said intermittent feeding member and partly by said rotatable carrier.

30. In a film handling apparatus, in combination, a rotatable delivery carrier for a film divided into frame sections for projection or exposure, a reciprocable auxiliary film feeding member mounted to engage the film in a bight thereof between said intermittent member and said carrier, operative movement of said feeding member for feeding the film being effective to move said auxiliary member toward said intermittent member and partly straighten out said bight and move a portion of one of said frame sections directly from said delivery carrier, resilient means for resisting the movement of said auxiliary member toward said intermittent member, said resilient means being powered to move said auxiliary feeding member to restore said bight in the film at such speed as to reach the end of its reciprocable travel away from the intermittent member approximately at the beginning of the advance of the film by the next succeeding feeding movement of said feeding member, said auxiliary member being so mounted with respect to said reel and said intermittent feeding member that its said return movement by action of said resilient means is effective for unwinding from said delivery carrier upon its return movement the remaining portion of one frame section of the film required for the next advance of the intermittent feeding member.

31. In a film handling apparatus, a rotatable film carrier, an intermittent film feeding member for drawing a film from said carrier, a continuously revoluble driving member for operating said intermittent member, a movable auxiliary reciprocable feeding member engaging the film between said carrier and said intermittent member and forming a bight in the film therebetween, a spring urging said reciprocable member toward the film, movement of the film by the operation of said intermittent feeding member being effective to draw film directly from said delivery carrier and to move said reciprocable member against the power of said spring thereby compressing said spring, return movement of said reciprocable member under the influence of said spring being effective to reestablish said bight and thereby cause a further unwinding movement of the film, the force of said spring in relation to the inertia of the delivery reel and the force, speed and frequency of said intermittent feeding member being such as to limit the peripheral unwinding speed of the carrier to one never substantially in excess of the speed of said continuously revoluble driving member whereby excessive slack in the film followed by excessive tension when said slack is exhausted is avoided.

32. In a film handling apparatus, a delivery carrier and a yieldingly driven take-up carrier between which a film extends, a gate disposed between said carriers, toothed means for intermittently feeding a film from said delivery carrier through said gate and toward said take-up carrier, a first auxiliary feeding mechanism positioned between said carrier and said gate for moving a portion of the film required by each movement of the intermittent feeding means from said delivery carrier during the periods of rest of said intermittent feeding means and for cushioning the film against the pull of said intermittent feeding means when said feeding means pulls the remaining portion of the film required by each movement thereof directly from said delivery carrier, said first mechanism including a movable supporting member, a film engaging surface, resilient means for supporting said engaging surface upon said supporting member, and resilient means urging said supporting member toward the film and adapted to act in opposition to the traction of said film, the resilience of said two means being substantially different, and a second auxiliary feeding mechanism positioned between said gate and said take-up carrier for moving the film away from said intermittent feeding means and advancing it along its path towards said take up carrier and for cushioning the film against the pull of said take-up carrier during the periods of idleness of said intermittent feeding means, said second mechanism including a movable supporting member, a film engaging surface, resilient means for supporting said engaging surface upon said movable member, and resilient means urging said movable member toward the film and adapted to act in opposition to the traction of the film, said resilience of said two previously last mentioned means being substantially different.

33. In a film handling apparatus, a film supporting member and a toothed film feeding member, between which a film extends in a bight, and means for controlling the tension of the section of film extending between said members, said tension controlling means comprising a movable supporting member, a film engaging guide disposed within said bight for making contact between said member and the film, and yielding means for securing said guide to said supporting member.

34. In a film handling apparatus, a film supporting member and a toothed film feeding member, between which a film extends in a bight, and means for controlling the tension of the section of film extending between said members, said tension controlling means comprising a pivotally mounted supporting arm, a film engaging guide disposed within said bight, and yielding means for supporting said guide upon said arm.

35. In a film handling apparatus, a film supporting member and a toothed film feeding member, between which a film extends in a bight, and means for controlling the tension of the section of film extending between said members, said tension controlling means comprising a movable supporting element, a spring urging said element toward the film, a film engaging guide disposed within said bight, and a spring for supporting said guide upon said element.

36. In a film handling apparatus, a film supporting member and a toothed film feeding member, between which a film extends in a bight, and means for controlling the tension of the section of film extending between said members, said tension controlling means comprising a movable supporting element, a spring urging said element toward the film, a film engaging guide disposed within said bight, and a spring for supporting said guide upon said element, the force of said springs being materially different, whereby one spring can move in relation to the constants of said apparatus while the other spring can move in relation to the variables thereof, the operation of the one spring not interfering with the movement of the other thereof.

37. In a film handling apparatus, a film supporting member and a toothed film feeding member, between which a film is adapted to extend in a bight, and means for controlling the tension of that section of the film extending between said members, said tension controlling means comprising a film tensioning means having a resilient supporting portion and a resilient film engaging portion extending therefrom into engagement with the film within said bight, the degree of the resilience of said portions of said film tensioning means being of marked difference.

38. In a film handling apparatus, a delivery carrier, a gate, powered means for intermittently feeding film supported by said carrier through said gate, and an auxiliary feeding mechanism engaging the film between said gate and said carrier and constructed to assure the continuous operation of said delivery carrier, at rates of speed which vary in step with the successive periods of operation of said intermittent feeding means, whereby that portion of the film between said carrier and said intermittent means is maintained continuously in motion, said mechanism including a pivoted supporting member, a relatively very yielding film-engaging pad mounted thereupon for movement therewith, and a spring attached to said member and arranged in opposition to the traction of the film over said pad.

39. In a film handling apparatus, a film carrier, a gate, means effective for intermittently feeding the film supported by said carrier through said gate, and an auxiliary feeding mechanism positioned between said carrier and said gate and constructed to move a portion of the film required by each movement of the intermittent feeding means from said carrier during the periods of rest of said intermittent feeding means and to cushion the film against the pull of said intermittent feeding means when said feeding means pulls the remaining portion of the film required by each movement thereof directly from said carrier, said mechanism including a pivoted member, a film engaging member, a spring for supporting said engaging member upon said pivoted member, and a spring attached to said pivoted member and adapted to act in opposition to the traction of said film, said springs being of substantially differing magnitudes.

40. In a film handling apparatus, a gate, a yieldingly and continuously driven take-up carrier, toothed means for intermittently feeding the film from said gate toward said take-up carrier, and an auxiliary feeding mechanism positioned between said gate and said carrier for moving the film away from said intermittent feeding means and advancing it along its path toward said take-up carrier and for cushioning the film against the pull of said take-up carrier during the periods of idleness of said intermittent feeding means, said mechanism including a pivoted member, a film engaging member, a spring for supporting said engaging member upon said pivoted member, and a spring attached to said pivoted member and adapted to act in opposition to the traction of the film, said springs being of substantially differing magnitudes.

41. In a film handling apparatus, a film carrier, means for feeding the film in relation to said carrier, and means for controlling the tension of that section of the film between said carrier and said feeding means, said tension controlling means including a member movable angularly relatively to the film and characterized by a film engaging surface, mounted upon the body of said member and resiliently and bodily movable relatively to the body of said member and to the film, over which the film passes between said carrier and said feeding means.

42. In a film handling apparatus, a delivery carrier, means for intermittently feeding film therefrom, a take-up carrier, yielding means for driving said carrier, and means for controlling the tension of the length of film between said carriers, said tension controlling means including a member angularly movable relatively to the film and engaging the film between said feeding means and said delivery carrier, a member angularly movable relatively to the film and engaging it between said feeding means and said take-up carrier, each of said members being characterized by a film engaging surface thereupon over which the film passes, said surface being resiliently movable relatively both to the film and to the body of said member.

43. In a film handling apparatus, a carrier, a gate, means for feeding film supported by said carrier therethrough, and means operated by the film for controlling the rate of rotation of said carrier, said means including a resilient member engaging the film between said carrier and said gate, a pivoted member upon which said film engaging member is mounted, a spring adapted to move said pivoted member in opposition to the action of the film when the film is moved by said feeding means, and braking means mounted upon and bodily movable with said pivoted member and effective to cooperate with said carrier upon the movement of said pivoted member by the action of said spring whereby the rate of rotation of said carrier is decreased upon movement thereof by said spring.

44. In a film handling apparatus, a member adapted to feed a film intermittently, a carrier adapted to take up the film fed thereto by said member, means for yieldingly driving said carrier from a source of power, and mechanism operated by the film for limiting the power applied to said carrier through said driving means, said mechanism including a film engaging member, a pivoted member upon which said film engaging member is resiliently mounted, a brake drum cooperating with said carrier, a brake shoe engaging said drum for controlling the operation thereof, and a member connecting said brake shoe and said supporting member whereby the movement of said pivoted member in one direction applies braking power to said shoe and the movement of said pivoted member in the other direction releases said shoe.

45. In a film handling apparatus, a carrier, a spindle upon which said carrier may be removably mounted, means for feeding the film supported by said carrier in relation thereto, and means operated by the film for controlling the rate of rotation of said carrier, said means including a guide engaging the film, a pivoted member upon which said guide is mounted, a spring adapted to move said pivoted member in opposition to the action of the film when the film is moved by said feeding means, a brake drum attached to said spindle and revoluble therewith, and braking means mounted upon said movable member for movement therewith and effective to cooperate with said drum upon the movement of said movable member by the action of said spring whereby the rate of rotation of said spindle and said carrier mounted thereupon is controlled.

46. In a film handling apparatus, a carrier, a spindle upon which said carrier may be removably mounted, means for feeding the film supported by said carrier therefrom, and means operated by the film for controlling the rate of rotation of said carrier, said means including a member engaging the film, a movable member upon which said film engaging member is mounted, a spring adapted to move said movable member in opposition to the action of the film when the film is moved by said feeding means, a brake drum attached to said spindle and revoluble therewith, a brake shoe, and a resilient member attached to said movable member, said shoe being mounted upon said resilient member and said resilient member being so disposed that said shoe is placed in cooperative relation to said drum whereby upon the movement of said movable member by the action of said spring the rate of rotation of said spindle and said carrier mounted thereupon is controlled.

47. In a film handling apparatus, a carrier, a spindle upon which said carrier may be removably mounted, means for feeding the film supported by said carrier in relation thereto, and means operated by the film for controlling the rate of rotation of said carrier, said means including a curved guide engaging the film, a movable member, means whereby said guide is yieldingly mounted upon said member, a spring adapted to move said movable member in opposition to the action of the film when the film is moved by said feeding means, a brake drum attached to said spindle, and a brake shoe mounted upon said movable member and effective to cooperate with said drum upon the movement of said movable member by the action of said spring whereby the rate of rotation of said spindle and said carrier mounted thereupon is controlled.

48. In a film handling apparatus, a film supporting carrier, a spindle upon which said carrier may be removably mounted, means for feeding the film in relation to said carrier, and means operated by the film for controlling the rate of rotation of said carrier, said means including a curved guide engaging the film, a movable member, means for yieldingly mounting said guide upon said member, a leaf spring adapted to move said movable member in opposition to the action of the film when the film is moved by said feeding means, a brake drum attached to said spindle, and a brake shoe mounted upon said leaf spring and so positioned as to cooperate with said drum upon the movement of said movable member under the influence of the film in opposition to said spring whereby the rate of rotation of said spindle and said carrier mounted thereupon is controlled.

49. In a film handling apparatus, a revoluble film supporting member and a toothed film feeding member, between which a film is adapted to extend in a bight, means for applying power to at least one of said members for moving the film between said members, and means for controlling the tension of that section of the film extending between said members, said tension controlling means comprising a unitary film-tensioning and braking structure movable as a unit under the influence of the film and against its own resilience and having a film contacting portion engaging the film within said bight, a resilient portion urging said film contacting portion against the traction of the film, and a braking portion extending into operative engagement with said revoluble film supporting member, whereby the traction of the film over said film engaging portion moves said structure as a unit and operates said braking portion.

CLARKSON U. BUNDICK.
BARTON A. PROCTOR.